United States Patent [19]

Koeijmans

[11] 3,792,442

[45] Feb. 12, 1974

[54] APPARATUS FOR CONTROLLING THE TRANSFER OF DATA FROM CORE TO DISC STORAGE IN A VIDEO DISPLAY SYSTEM

[75] Inventor: Gerard D. Koeijmans, Dallas, Tex.

[73] Assignee: Mobil Oil Corporation, New York, N.Y.

[22] Filed: June 15, 1972

[21] Appl. No.: 263,325

Related U.S. Application Data

[63] Continuation-in-part of Ser. No. 85,761, Oct. 30, 1970, Pat. No. 3,742,289, which is a continuation of Ser. No. 812,213, April 1, 1969, abandoned.

[52] U.S. Cl. .......................... 340/172.5, 340/174.1 G

[51] Int. Cl. .......................... G11b 13/00

[58] Field of Search .......................... 340/172.5, 174.1 G

[56] References Cited

UNITED STATES PATENTS

| | | | |
|---|---|---|---|
| 3,337,852 | 8/1967 | Lee et al. | 340/172.5 |
| 3,490,006 | 1/1970 | Macon et al. | 340/172.5 |
| 3,521,240 | 7/1970 | Bahrs et al. | 340/172.5 |
| 3,629,860 | 12/1971 | Capozzi | 340/172.5 |
| 3,327,294 | 6/1967 | Furman et al. | 340/172.5 |
| 3,437,998 | 4/1969 | Bennett et al. | 340/172.5 |
| 3,439,340 | 4/1969 | Gallaher | 340/172.5 |
| 3,493,935 | 2/1970 | Questa | 340/172.5 |
| 3,601,808 | 8/1971 | Vlack | 340/172.5 |
| 3,623,006 | 11/1971 | Balakian et al. | 340/172.5 |

*Primary Examiner*—Paul J. Henon
*Assistant Examiner*—Melvin B. Chapnick
*Attorney, Agent, or Firm*—A. L. Gaboriault; George W. Hager, Jr.

[57] ABSTRACT

A video display system comprises a memory for storing digital data, a digital disc for recording digital data, a digital-to-analog converter for converting digital data to an analog video signal, and a TV monitor for displaying analog video signals. An interface controller controls the transfer of a sector address from the computer into a sector address register in timed relationship with a clock pulse from the disc storage unit, such clock pulse indicating that the disc storage unit has been rotated to its starting position adjacent the magnetic write heads. When the disc storage unit is thereafter rotated to the angular position represented by the sector address, data is transferred by way of the magnetic write heads from the computer to disc storage. A reply signal is then sent to the computer, indicating that the transfer of data has taken place.

4 Claims, 12 Drawing Figures

APPARATUS FOR CONTROLLING THE TRANSFER OF DATA FROM CORE TO DISC STORAGE IN A VIDEO DISPLAY SYSTEM

This application is a continuation-in-part of application Ser. No. 85,761, filed Oct. 30, 1970, and now issued as U.S. Pat. No. 3,742,289, which is a continuation of application Ser. No. 812,213, filed Apr. 1, 1969, now abandoned.

BACKGROUND OF THE INVENTION

This invention relates to a video display system for displaying geophysical and seismic data on an intensity-modulated cathode-ray tube display device. In a more specific aspect, the invention relates to apparatus for controlling data flow between various portions of such video display system.

In U.S. Pat. No. 3,742,289, there is disclosed a video display system which is incorporated in an over-all computer graphics display system. A cathode-ray tube display device having means for sweeping an electron beam in a raster scan is driven by a cyclical storage device which as a drum or a disc. The system includes a memory which receives digital data from a data source such as a digtal computer. The data is transferred from the memory to the cyclical storage device. A digital-to-analog converter coupled to the cyclical storage device provides an analog video signal for intensity modulating the electron beam of a cathode-ray tube display device.

An interface controller is provided for controlling the transfer of digital data from the memory to the cyclical storage device and from the cyclical storage device to the digital-to-analog converter. The digital computer provides command signals, such command signals controlling the operation of the interface controller. Each command signal instructs the interface controller to carry out a particular step or function in the transfer of the digital data.

SUMMARY OF THE INVENTION

The present invention is directed to such a video system for displaying digital data. More particularly, it is directed toward new and improved apparatus for controlling the flow of such data through the video system. In this aspect, an interface controller is provided for generating timing and control signals in response to command signals from the digital computer. Such timing and control signals direct the flow of data from the memory to the cyclical storage device and from the cyclical storage device to the digital-to-analog converter.

More particularly, this invention provides means for directing the transfer of digital data from the memory to a particular sector location on the cyclical storage device. The digital computer issues a sector address code identifying the sector location on the cyclical storage device on which digital data from the memory is to be stored. In this aspect, the transfer of the digital data from the memory to the cyclical storage device is accomplished when the particular sector identified by the sector address code has been located in a position adjacent the magnetic write heads of the cyclical storage device.

It is a particular feature of the present invention that the sector address code be strobed into a sector address register in response to a track origin signal from the cyclical storage device. The track origin signal is generated at the beginning of each revolution of the disc just prior to the rotation of the first data storage sector past the magnetic write heads. Thereafter, the cyclical storage device generates a sector clock signal upon the rotation of each data storage sector on the disc to a position adjacent the magnetic write heads. These sector clock signals are counted by a sector counter. The sector address code stored in the sector address register and the count output of the sector counter are compared and a coincidence signal generated when the sector on which digital data is to be stored is located adjacent the magnetic write heads. This coincidence signal initiates the transfer of the digital data from the core memory to the cyclical storage device.

DESCRIPTION OF THE PREFERRED EMBODIMENTS

Figures 1, 8:
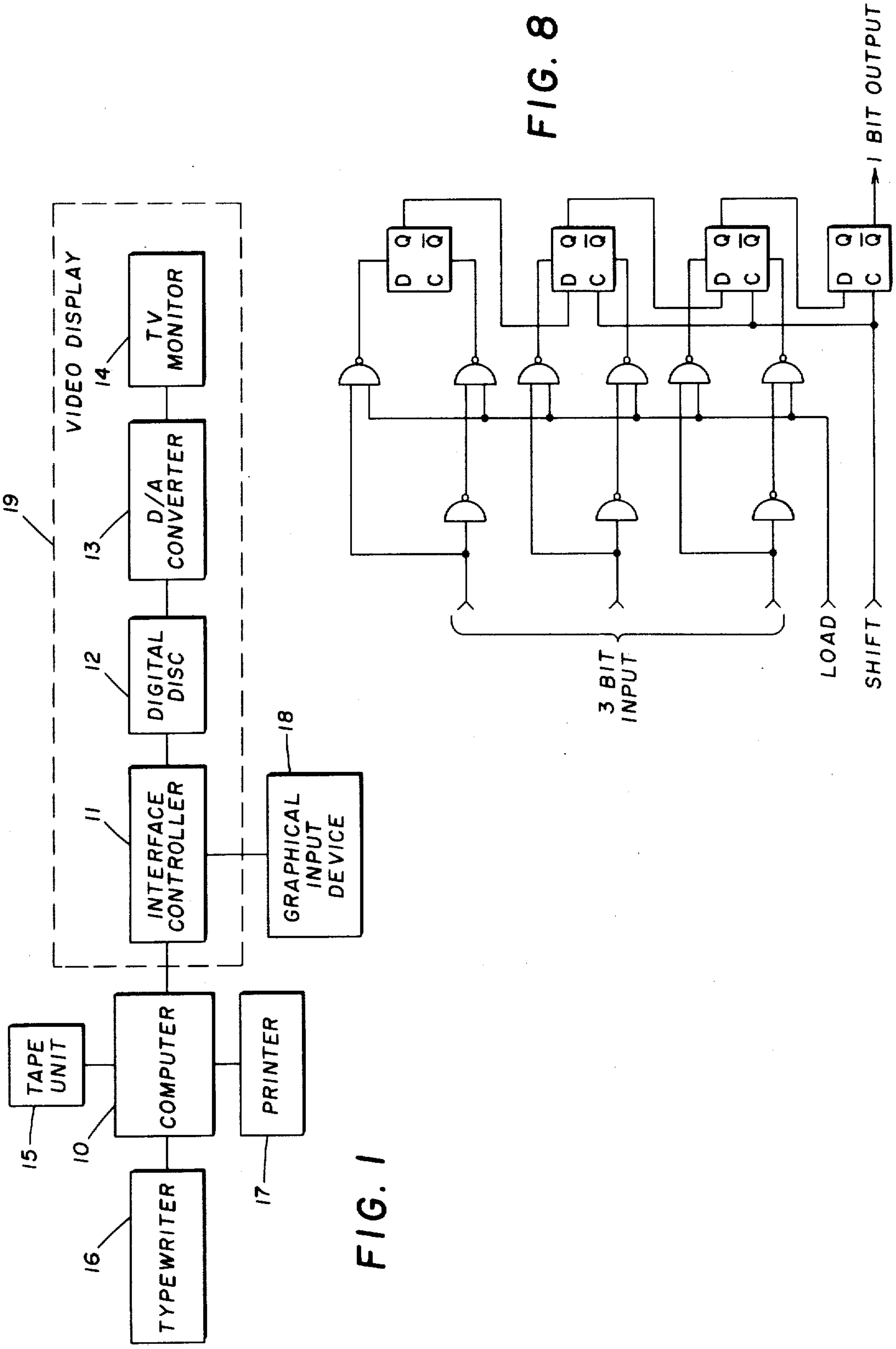
FIG. 1 is a block diagram of an over-all computer interactive graphics system embodying the invention.
FIGS. 3–8 are detailed logic schematics of various portions of the interface controller of FIG. 2.

A video display system, as embodied in the present invention, is particularly adapted for use in a computer graphics system of the type illustrated in FIG. 1. The conventional components of such computer graphics system as illustrated includes a digital computer 10 for controlling operation of the video display system 19 including an interface controller 11, a digital disc 12, a digital-to-analog (D/A) converter 13, and a high-resolution TV monitor 14 which is a cathode-ray display device. Tape units 15, typewriter 16, and printer 17 are coupled as peripheral units to computer 20. A graphical input device 18 is coupled to the video display system 19 to permit man-machine communication whereby a geophysicist, for example, can "talk" to the computer and change any one of the traces displayed on the TV monitor by operating on the data stored in the computer.

For the purpose of illustrating the video display system as an integral part of a computer graphics system, a general description of the operation of the video display system shown in FIG. 2 will first be presented, following which details of the operation of the interface controller will be described.

Figure 2:
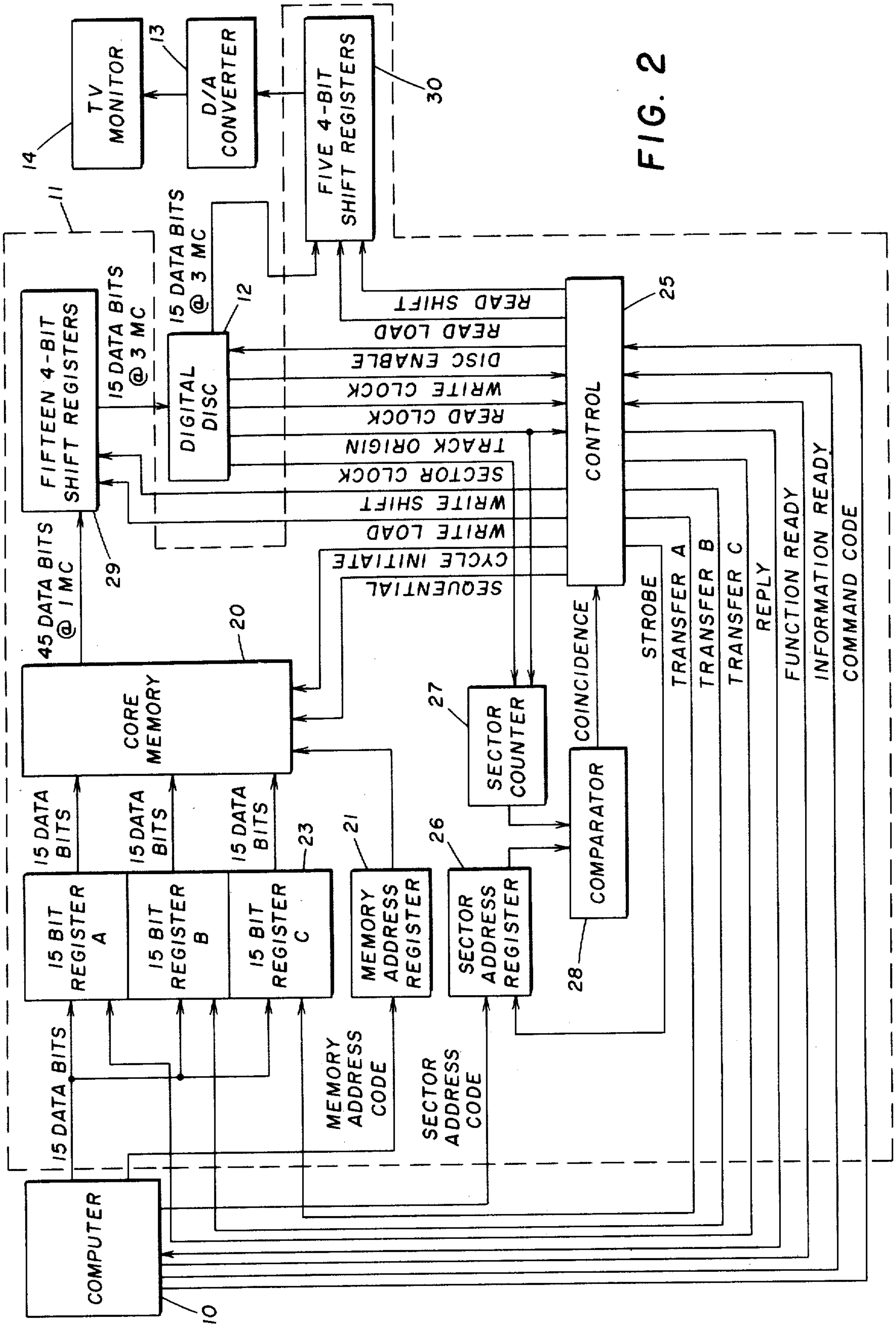
FIG. 2 is a block diagram of the video display portion of the computer graphics system of FIG. 1.

Referring now to FIG. 2, geophysical data representing a seismic trace is stored in a computer 10. Initially, computer 10 loads a memory address code into memory address register 21. After the memory address code has been loaded into memory address register 21, computer 10 then loads the first 15-bit data word into part A of the 45-bit buffer register 23. Then, the second 15-bit word of data is loaded into part B of register 23, and finally, the third 15-bit word of data is loaded into part C. After register 23 has been filled, the control unit 25 will signal the register 23 to transfer the 45-bit contents of register 23 into the core storage location of core memory 20 designated by the memory address code stored in memory address register 21. This transfer is directed by three control signals, transfer A, transfer B, and transfer C, from control unit 25 to the A, B, and C parts of register 23, respectively. The foregoing-described operation will be repeated until all the geophysical data representative of the seismic trace is stored in core memory 20.

Now that a seismic trace has been stored in core memory 20, the data is recorded in the proper sector of the digital disc 12. Computer 10 sets the sector address register 26 with a 10-bit sector address code. The digital disc 12 provides track origin and sector clock signals to a sector counter 27. When the output of the sector counter 27 is the same as the output of the sector address register 26, the comparator 28 will provide a coincidence signal to control unit 25. Control unit 25 provides a disc enable signal for enabling the digital disc 12 to record data.

The digital disc 12 records 15 bits of data at a 3-megacycle rate, while the core memory 20 reads out 45 bits of data at a 1-megacycle rate. To accomplish the transfer, 45 bits of data are transferred out of the core memory in parallel into fifteen 4-bit shift registers 29. The data is shifted out of register 29 serially as three 15-bit words to the data disc at a 3-megacycle rate.

Data recorded on the digital disc is applied to the D/A converter 13 for display on TV monitor 14. D/A converter 13 receives data at a 9-megacycle rate. Data which is read from the digital disc at a 3-megacycle rate is converted to a 9-megacycle rate by five 4-bit shift registers 30. This is accomplished by the transfer of three 5-bit words in parallel from the data disc into the shift register and then the transfer of three 5-bit words serially from the shift register to the D/A converter.

The 5-bit words transferred into the D/A converter are changed into a continuous analog video signal which intensity modulates the electron beam of the TV monitor 14.

In the transfer of data bits from the computer to the core memory or to the data disc, the computer generates various commands which direct these transfers. Each of these commands sets a flip-flop which controls the transfer. Each time a flip-flop is set or a word is transferred out of the computer, a reply signal is sent by way of control unit 25 to the computer. A reply signal, in effect, is a control signal which tells the computer that the transfer directed by the command has been carried out. However, such a reply signal will be produced only in timed coincidence with timing signals information ready and function ready from the computer. The information ready signal indicates that data stored in the computer is available for transfer to the buffer register 23. The function ready signal indicates that a command for directing a transfer is available. The sequence and timing of commands must be adhered to for successful transfers. Therefore, only after the receipt of a reply signal will the computer issue a new command for the next step or transfer. Other control signals necessary for the operation of the video display system are indicated by the legends strobe, track origin, sector clock, read clock and write clock, write load, write shift, read load, read shift and clear/write. These control signals will be fully described along with the information ready and function ready signals later on in the specification.

With the foregoing understanding of the generalized flow of data as illustrated in FIG. 2, there will now be described a specific embodiment of the interface controller 11 in order that further details of operation may be understood. Such a description is best set forth in terms of the various functions which the interface controller performs. These functions are listed as follows:

(1) Loading the core memory with seismic traces from the computer, (2) Loading the digital disc with seismic traces from the core memory, (3) Displaying the seismic traces from the digital disc on the TV monitor, and (4) Timing and controls.

Reference will hereinafter be made in both the description and accompanying drawings to timing signals and control signals by way of legends generally representing abbreviations of the functions involved. It will be helpful in considering the following description and drawings to refer to the signals and their legends as contained in TABLE I.

TABLE I

| Legend | Signal |
|---|---|
| FR | Function Ready |
| IR | Information Ready |
| MC | Master Clear |
| DA | Data Available |
| BC/SC | Bit Cell/Sector Comparison |
| TC | Termination Code |
| MAF | Memory Address Flip-Flop Output |
| CWMF | Clear/Write Mode Flip-Flop Output |
| SMF | Sequential Mode Flip-Flop Output |
| SAF | Sector Address Flip-Flop Output |
| DDW/SF | Data Disc Write/Select Flip-Flop Output |
| R/SF | Random/Sequential Flip-Flop Output |

LOADING THE CORE MEMORY WITH A SEISMIC TRACE FROM THE COMPUTER

In order to load a seismic trace into the core memory at a specific starting address, the following steps must be performed:

a. A memory address flip-flop must first be selected to load the memory address code in the memory address register before the computer sends seismic data, b. After the memory address flip-flop has been selected, the memory address code is then loaded into the memory address register, c. Next, a sequential mode flip-flop is selected so that the memory will automatically change from random mode to sequential mode of addressing after the first 45-bit word has been loaded in the address location specified by the address register, d. A clear/write mode flip-flop is then selected for the purpose of placing the core memory in the proper mode to store the seismic trace, e. When the clear/write mode flip-flop has been selected, the memory system will automatically switch the core memory from a random address mode to a sequential address mode after the first three 15-bit data words have been stored in the core memory at the address location selected by the memory address code. Each word in the core memory will be a 45-bit word, and f. After the last word has been stored in the core memory, a termination code will be generated to reset the sequential mode flip-flop and the clear/write mode flip-flop.

Steps (a) through (f) will now be described in detail in connection with the circuitry shown in FIGS. 3–8.

The computer utilized in one embodiment of the present invention is a MAC-16 supplied by Lockheed Electronics Company of Los Angeles, Cal. This computer is a 16-bit word computer which communicates with the interface controller 11 by way of data channels and separate address channels.

A core memory suitable for use in the video display system of the present invention is a Lockheed Model CE-124-LT Memory System from Lockheed Electronics Company, Los Angeles, Cal. Two such memory systems are coupled together to form a 4K × 48-bit memory.

Figure 3:
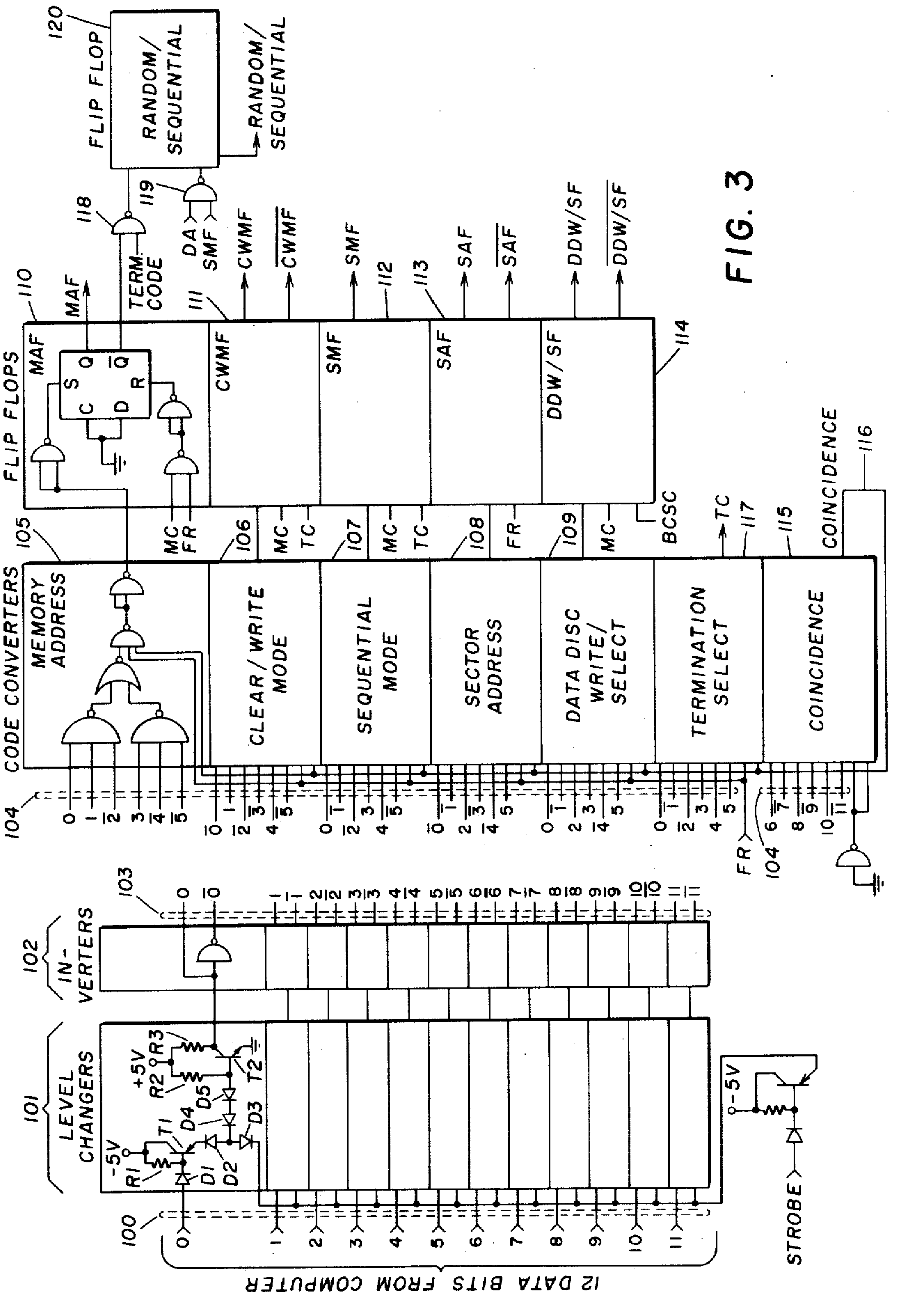
Figure 4:
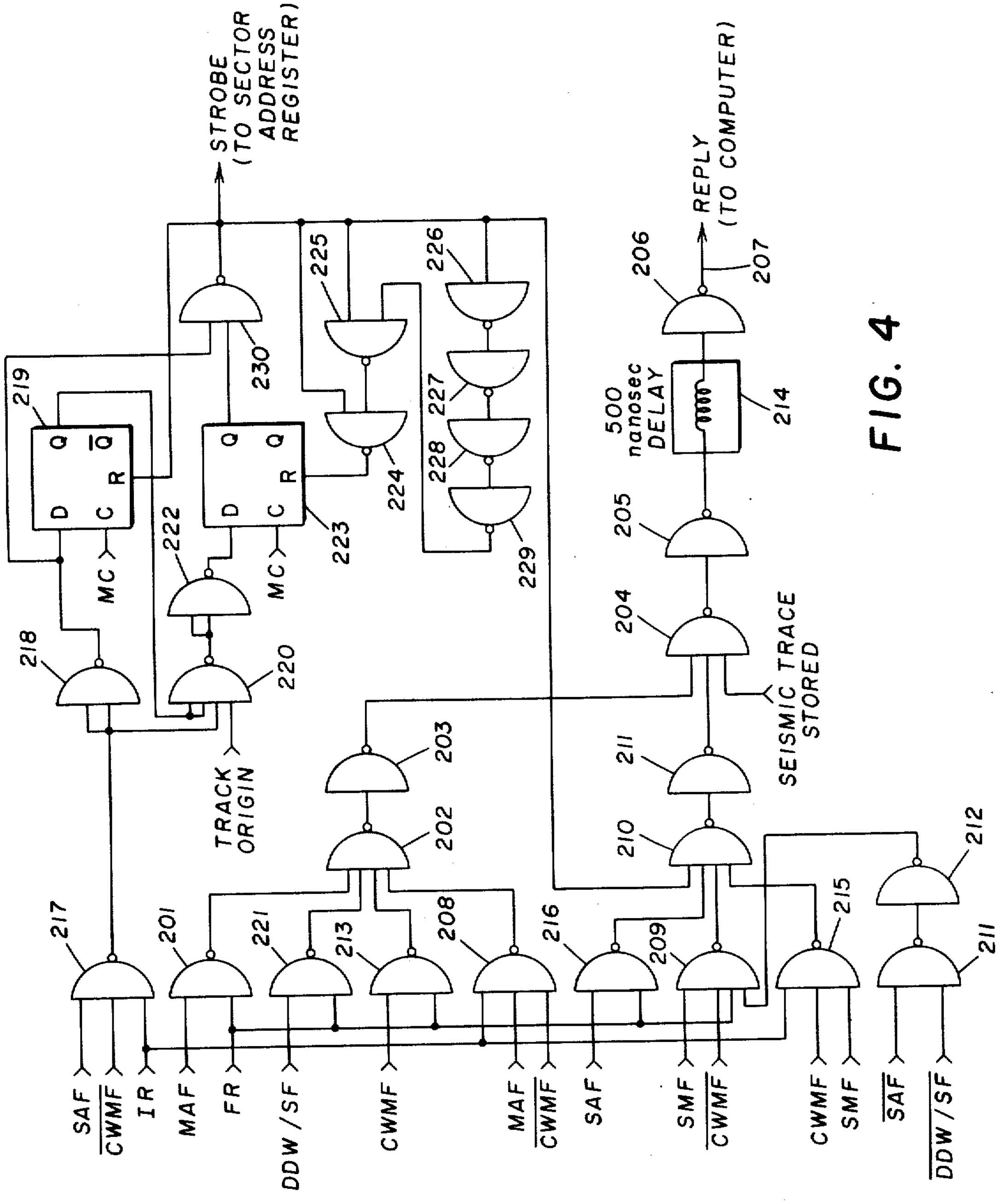

The computer initiates each of the foregoing steps (a) — (f) by sending a command code in the form of 12-data bits to the control unit 25. Referring to FIG. 3, these 12-bit codes are applied by way of lines 100 to 12 level changers 101 and 12 inverters 102. Level changers 101 are logic-level changers necessary to change the computer logic levels to integrated circuit logic levels. Inverters 102 provide for both true outputs and complements of the 12-bit data code on output lines 103. Lines 103 are then selectively coupled by way of lines 104 to the inputs of seven code converters. A memory address converter 105, a clear/write mode converter 106, a sequential mode converter 107, a sector address converter 108, and a data disc write/select converter 109 each decodes the data bits on lines 104 to selectively initiate the step directed by the computer code. Each converter, upon being set to a logic "1" by its respective input code, sets one of the five corresponding flip-flops to a logic "1". Such flip-flops, a memory address flip-flop 110, a clear/write mode flip-flop 111, a sequential mode flip-flop 112, a sector address flip-flop 113, an a data disc write/select flip-flop 114 will hereinafter be referred to as MAF flip-flop 110, CWMF flip-flop 111, SMF flip-flop 112, SAF flip-flop 113, and DDW/SF flip-flop 114. A termination select converter 117 produces a TC signal when the last data word has been stored in core memory.

The operation of each of the foregoing code converters and flip-flops will now be more fully detailed as a part of steps (a) — (f) of this section excepting for the sector address converter 108, the SAF flip-flop 113, the data disc write/select converter 109, and the DDW/SF flip-flop 114, which will each be detailed later on in the section describing the loading of a seismic trace onto the data disc. A coincidence converter 115 decodes the lower six bits of the data code, bits 6 through 11. If there is a logic "1" in bit 6, bit 8, and bit 10 and a logic "0" in bit 7, bit 9, and bit 11, the coincidence converter will be set to an output of logic "1". This logic "1" is coupled by way of line 116 to the inputs of each of the other code converters. Also, an FR signal from the computer is coupled to the input of each converter except for the coincidence converter 115. Together with the FR signal and the coincidence signal, each of these converters will produce a logic "1" at its output upon the presence of the appropriate six bits at its input.

Step (a)

Memory address converter 105 unscrambles the upper six bits of the 12-bit code and with the proper combination of "1s" and "0s" in bits 0 - 5 will generate a logic "1". This logic "1" is fed to the input of MAF flip-flop 110 to set the flip-flop to a logic "1". When the MAF flip-flop becomes a logic "1", its complementary output is applied by way of NAND gate 118 to set random/sequential flip-flop 120 to a logic "1". Random/sequential fliplflop 120 will hereinafter be referred to as R/SF 120. The logical "1" output sets the core memory to the random addressing mode. Such gates, such as NAND gate 118, for example, will hereinafter be referred to as NAND 118 to minimize repetition of the term "gate." The MAF flip-flop 110 is reset by either an MC signal or an FR signal from the computer. The R/SF flip-flop 120 in addition to being set to a logic "1" by the complementary output of the MAF flip-flop may also be set to a logic "1" by the application of the TC signal from the termination select converter 117. Both the MAF flip-flop output and the TC signal are applied to R/SF flip-flop 120 by way of NAND 118. When the MAF flip-flop becomes a logic "1", it also applies an MAF signal to NAND 201 of FIG. 4. The MAF signal is "anded" with the FR signal to set NAND 201 to a logic "0" state. This logic "0" state of NAND 201 sets NANDs 202, 203, 204, 205, and 206 and delay circuit 214 so as to provide a reply signal on line 207 of logic "1". This reply signal instructs the computer to initiate step (b).

Step (b)

Upon receipt of a reply signal indicating that MAF flip-flop 110 has now been set and addressing is in the random mode, the computer now generates an IR signal. The IR signal is applied to NAND 208 where it is "anded" with the MAF signal and the complement of the CWMF signal, $\overline{CWMF}$, from the CWMF flip-flop 111. Such combination at the input of NAND 208 sets NAND 208 to a logic "0". This logic "0" state of NAND 208 sets NANDs 202, 203, 204, 205, and 206 and delay circuit 214 to provide a logic "1" on line 207 as a reply signal to the computer. The output of NAND 208 strobes the 12-bit memory address code into a 12-stage parallel memory address register 21. Logic cards RT801 supplied by Monitor Systems, Inc., 401 Commerce Drive, Fort Washington, Pa., may be utilized for the 12 parallel stages of memory address register 21.

Step (c)

Figure 5:
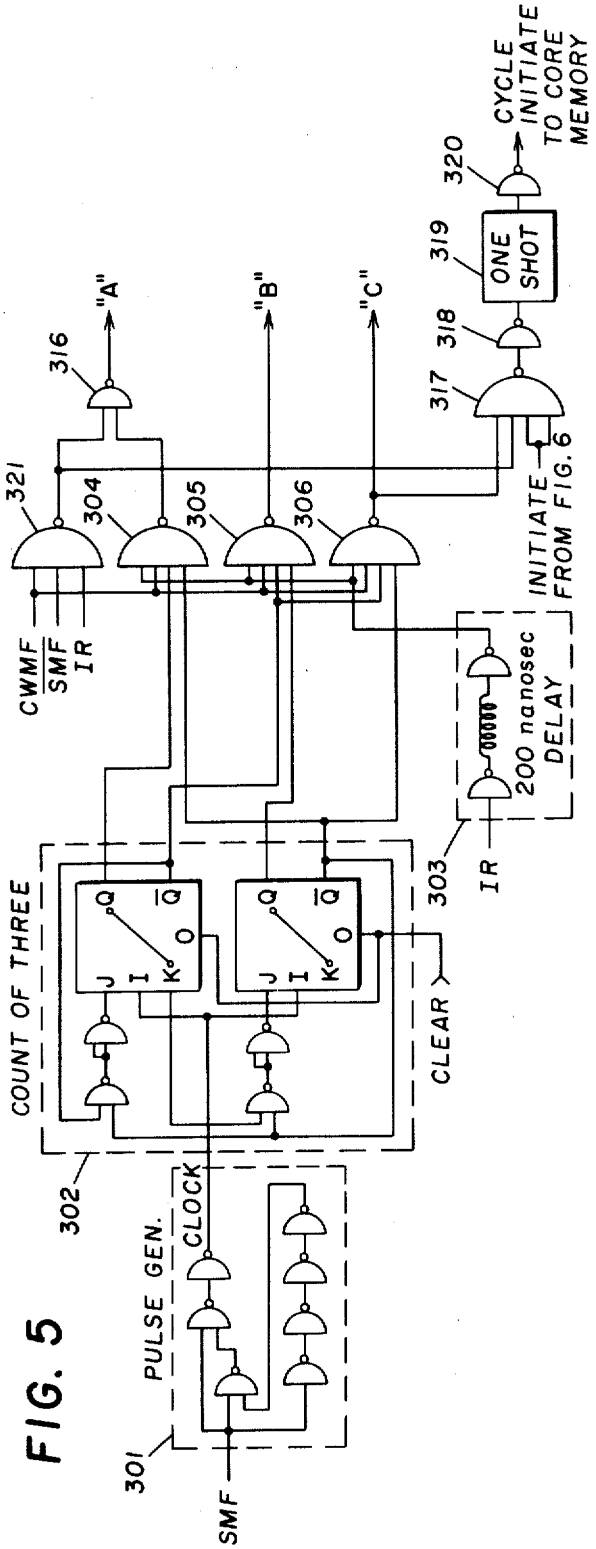
Figure 7:
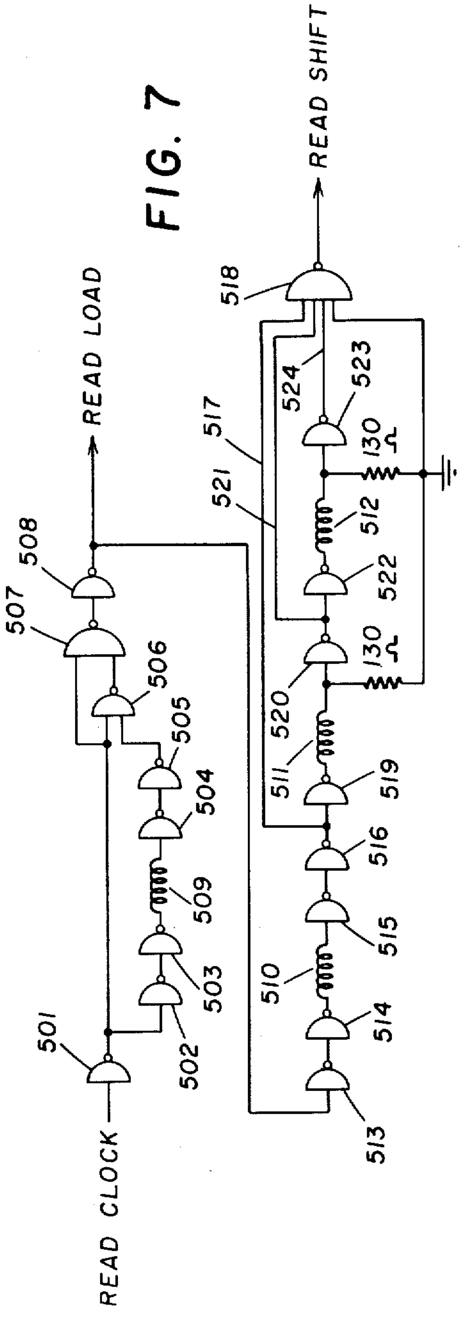

The next step is the selection of the sequential mode of operation. The MAF flip-flop 110 is reset by the start of the FR signal to a logic "0". The computer now sends the code for the sequential mode to the 6-data-bit inputs of the sequential mode converter 107 by way of level changers 101 and inverters 102. Upon the decoding of such code by the sequential mode converter 107, the SMF flip-flop 112 is set to a logic "1" until it is reset by either an MC signal or a TC signal. The SMF flip-flop provides an SMF signal which is "anded" with a DA pulse from core memory 20 by NAND 119 for resetting the R/SF flip-flop 120 to a logic "0". The DA pulse is provided 450 nanoseconds after the cycle initiate pulse appears on the output of gate 320 (FIG. 5). This logic "0" state on the output of R/SF flip-flop 120 is applied as a sequential signal to the core memory 20 to place the addressing in the sequential mode after the first 45-bit word has been stored in core memory 20. The SMF signal is also applied to NAND 209 where it is "anded" with the FR signal and the $\overline{CWMF}$ signal to set NAND 209 to a logic "0" state. This logic "0" state of NAND 209 sets NANDS 210, 211, 204, 205, and 206 and delay circuit 214 to provide a logic "1" on line 207 as a reply signal that the addressing is now in the sequential mode. The SMF flip-flop will remain a logic "1" until a TC signal is provided as a reset signal. To prevent sending more than one reply signal while the SMF flip-flop is in the logic "1" state, the $\overline{SAF}$ signal from the SAF flip-flop 113 and the $\overline{DDW/SF}$ signal from the DDW/SF flip-flop 114 are applied by way of NANDS 211 and 212 to NAND 209. Therefore, NAND 209 is set to a logic "1" provided that neither the SAF flip-flop 113 nor DDW/SF flip-flop 109 has been set. Upon the receipt by the computer of the reply signal indicating that the sequential mode of operation has been selected, the computer then advances to step (d).

Step (d)

In step (d) the code for the clear/write mode is applied from the computer through level changers 101 and inverters 102 to the converter input lines 104. Upon detection of this code by the clear/write mode converter 106, the clear-write mode (CWMF) flip-flop 111 is set to a logic "1" output. This output is applied to NAND 213 where it is "anded" with the FR signal to set NAND 213 to a logic "0" state. This logic "0" state of NAND 213 sets NANDs 202, 203, 204, 205, and 206 and delay circuit 214 to provide for a logic "1" on line 207 as a reply signal to the computer. Upon receipt of this reply signal by the computer, step (e) is indicated.

Step (e)

The IR signal is "anded" by NAND gate 215 with the CWMF signal of CWMF flip-flop 111 and SMF signal of the SMF flip-flop 112 to set NANDs 210, 211, 204, 205, and 206 and delay circuit 214 to provide a reply signal on line 207 to the computer. At the same time, the SMF signal is applied to the input of pulse generator 301, FIG. 5, which provides clock pulses to the count-of-3 circuit 302. Circuit 302 is a 2-bit counter which can count to three only. The first clock pulse into the counter will set the counter to 1 0, the second pulse to 0 1, and the third pulse back to 0 0. The state 1 1 is not possible. Each one of these pulse counts is "anded" at NANDs 304, 305, and 306, respectively, with the CWMF signal and the IR signal which has been delayed 200 nanoseconds by delay circuit 303 to provide transfer pulses "A", "B", and "C" for loading a 15-bit data word from the computer into the 45-bit buffer register 23. Each of the three parts, A, B, and C, of the register 23 includes 15 parallel stages. Logic cards RT801, supplied by Monitor Systems, Inc., are suitable for utilization as the 45 stages of register 23. After the first 200-nanosecond delay of the IR signal, NAND 304 sets NAND 316 to provide a logic "1" on transfer line "A". The other input of NAND 316 is coupled to the CWMF signal, the $\overline{SMF}$ signal, and the IR signal by way of NAND 321 to provide random access storage of 15-bit words in core memory 20. Transfer signal "A" is applied to the input of each of the 15 registers in buffer register A and transfers the 15-bit data word into register A. Two hundred nanoseconds after the second IR signal, a transfer "B" signal is provided at the output of NAND 305. Transfer "B" is applied to each of the 15 registers in buffer register B for transferring the 15-bit data words into register B. Again, 200 nanoseconds after the next IR signal, NAND 306 applies a transfer "C" signal to each of the 15 registers in buffer register C to transfer the 15-bit data word into register C. The buffer register 23 now stores the entire 45-bit data word from the computer. The transfer "C" signal is "ORed" at NAND 317 with the output of NAND 321. NAND 317 is coupled by way of NAND 318 and a one-shot multivibrator 319 to NAND 320 which provides for a cycle initiate signal to core memory 20. The cycle initiate signal strobes the three 15-bit data words from buffer register 23 into core memory 20 at the address which has previously been loaded in the memory address register 21. The core memory, 450 nanoseconds later, sends a DA signal to NAND 119 (FIG. 3) which in turn sets the output of random/sequential flip-flop 120 to a logic "0", which is the logic level for the sequential mode of operation. Upon initiation of the sequential mode, the oprator sends the next data word to the 45-bit buffer register 23. Each time registers A, B, and C of buffer register 23 are filled up by three transfer signals "A", "B", and "C", NAND 320 applies a cycle initiate signal to the core memory 20. Each time the core memory receives the cycle initiate signal, the memory address register in core memory 20 is advanced one position and the next 45-bit data word will be stored in the core memory at this new address position. In the sequential mode, the memory address register in the core memory is automatically advanced each time a cycle initiate signal is received. When the entire seismic trace has been stored in the core memory, the program goes to its next step which is the generation of a TC signal.

Step (f)

In step (f) the computer generates a command code which is decoded by termination select converter 117 to provide a TC signal. The R/SF flip-flop 120 is reset to the random addressing mode by application of the TC signal to NAND 118. Also, the SMF flip-flop 112 and the CWMF flip-flop 111 are reset by the TC signal.

As described in steps (a) through (f), a word is stored in the core memory 20 following the selection of the MAF flip-flop 110 and the sending of an address to the memory address register 21. Addressing is then switched to the sequential mode, and the seismic trace is strobed into the core memory.

LOADING THE DIGITAL DISC WITH SEISMIC TRACES FROM THE CORE MEMORY

After the computer has loaded the core memory with a seismic trace, the trace will be loaded into the proper sector of the data disc.

A data disc suitable for use in video display system of the present invention is a Model 5208, F-series parallel digital disc supplied by Data Disc, Inc., Sunnyvale, Cal., consisting of 45 data channels, one clock track with 99743 clock pulses and a 7-pulse gap for the track origin pulse, and one sector track with 525 sector clock pulses.

Loading the data disc will be in accordance with the following sequence of steps:

a. The memory address flip-flop is selected to provide for read out of the core memory at a given memory address.
b. Next, the computer transfers the address code into the memory address register.
c. The sequential mode flip-flop is set to provide for read out of the samples in the same consecutive order as they were stored.
d. Before the core memory can be read out, the sector address flip-flop must be selected.

e. The proper address code is then loaded into the sector address register.

f. The computer then prepares the data disc to accept the seismic trace. This is accomplished by setting the data disc write/select flip-flop.

g. The computer then attempts to output one buffered word from the core memory. At this point the seismic trace is recorded onto the proper sector on the data disc. After the trace has been recorded, a reply signal will be generated and sent to the computer to make it think that the one buffered word has been accepted. In reality this word is not used, but it hangs up the computer until the trace has been recorded on the data disc.

h. The program sends a TC signal which generates a pulse to reset all the proper flip-flops.

The first three of the foregoing steps are exactly the same as the first three steps in the loading of the core memory with a seismic trace. Again, these steps are:

Step (a) Select the memory address flip-flop. Step (b) Load the memory address in the memory address register. Step (c) Select the sequential mode flip-flop.

The next step in the program, Step (d), selects the sector address flip-flop.

Step (d)

The SAF flip-flop 113 is set to a logic "1" when the sector address converter 108 detects the appropriate sector address code on lines 104. The SAF flip-flop output is an SAF signal applied to NAND 216. The SAF signal is "anded" with the FR signal to set NAND 216 to a logic "O" state. The logic "0" state of NAND 216 sets NANDs 210, 211, 204, 205, and 206 to provide a reply signal on line 207. This reply signal indicates to the computer that the sector address flip-flop has now been set.

Step (e)

Figure 12:
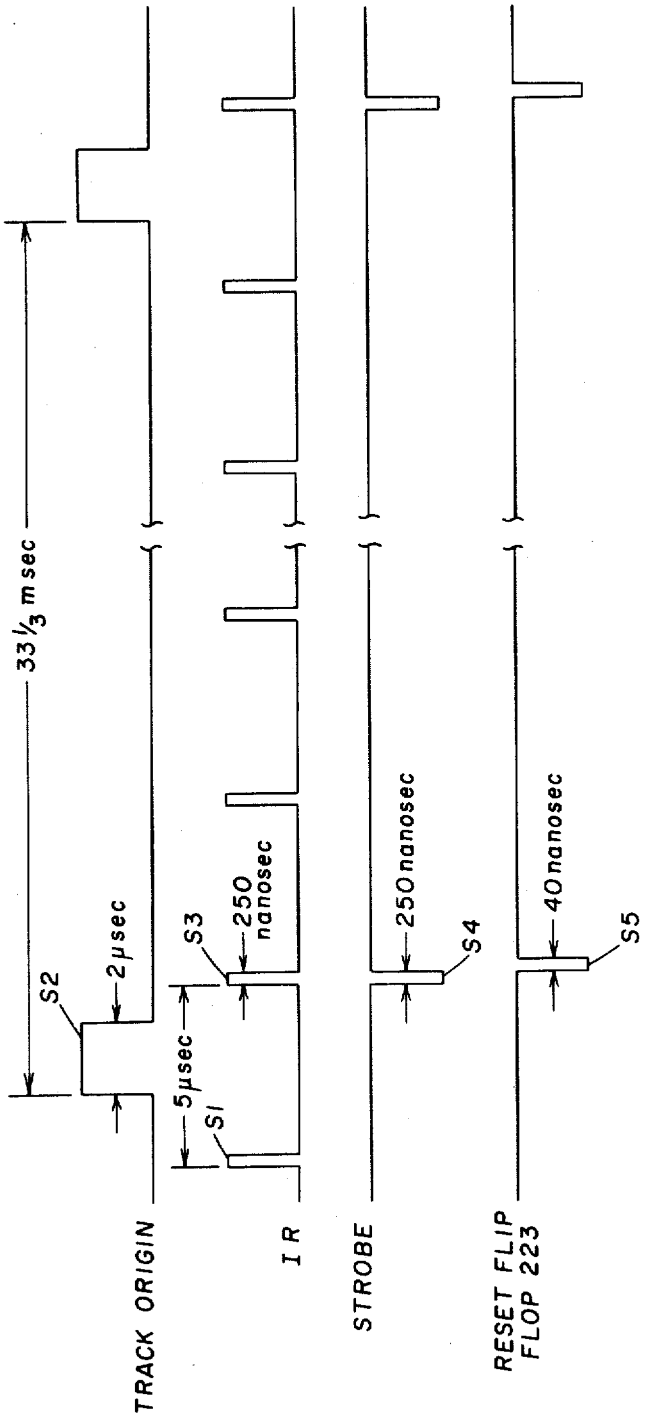
FIG. 12 is a timing diagram of the waveforms of signals at various points in the logic schematic of FIG. 4.

It is a particular feature of the present invention that the computer transfer the sector address into the sector address register in timed coincidence with the rotational position of the data disc. The availability of the sector address for transfer into the sector address register is indicated by the TR pulse. The rotational position of the data disc is indicated by the track origin signal. The combination of the IR signal and the track origin signal is utilized to generate the strobe signal for carrying out the actual transfer. It is also a particular feature of the present invention that the strobe signal be utilized as the reply signal to the computer indicating that the transfer has been made. This reply signal needs to be of a pulse width which the computer is capable of recognizing. Such a pulse width is the same pulse width as the IR pulses which the computer provides. In one embodiment of the invention, the computer provides a 250-nanosecond logic "1" IR signal every 5 microseconds and the digital disc provides a 2-microsecond-wide logic "1" pulse once for each revolution of the disc. The speed of the digital disc is 1,800 rpm. Therefore, a track origin pulse is provided every 33⅓ milliseconds. To accomplish the foregoing, after the 2-microsecond track origin signal has set flip-flop 223 to a logic "1" will cause a 250-nanosecond strobe signal to be produced at the output of NAND 230 (FIG. 4) for strobing the sector address code into the sector address register 26. The timing of th IR signal and track origin signal necessary to produce the 250-nanosecond strobe pulse may be more fully understood by reference to FIG. 12.

The $\overline{IR}$ signal along with the SAF signal and the $\overline{CWMF}$ signal are connected to NAND 217. NAND 217 therefore provides a 250-nanosecond logic "0" output pulse during the period of the $\overline{IR}$ signal, provided both the SAF signal and the $\overline{CWMF}$ signal are at a logic "1". The 250-nanosecond pulse from NAND 217 is connected as input to both NANDs 218 an 220. NAND 218 applies the 250-nanosecond pulse to the flip-flop 219 and NAND 220. Flip-flop 219 is set to a logic "1" at its Q output, which is connected to the input of NAND 220. At this time, the track origin input to NAND 220 is logic "0". Therefore, the output of NAND 220 is logic "1", the output of NAND 222 is logic "0", and flip-flop 223 is set at logic "0". This logic "0" output setting of flip-flop 223 sets the strobe output signal from NAND 230 to a logic "1".

Upon termination of this IR signal, S1, just prior to the track origin signal, S2, the IR signal input to NAND 217 goes to logic "0", causing the output of NAND 217 to return to logic "1" state. The output of NAND 218 returns to logic "0", but flip-flop 219 remains set at logic "1" until a logic "0" strobe signal is produced at the output of NAND 230. Now, all inputs to NAND 220 are logic "1" except for the track origin input.

Upon the occurrence of the 2-microsecond track origin signal, S2, a logic "1" is applied to the track origin input of NAND 220 to set NAND 220 to a logic "0" output. This in turn sets NAND 222 to a logic "1" which in turn sets flip-flop 223 to a logic "1". At this time, the IR signal is logic "0" and the output of NAND gate 218 is logic "0". Since the output of NAND 218 is one input to NAND 230, NAND 230 remains at logic "1".

The very next IR signal, S3, sets NAND 217 to a logic "0". This in turn sets the NAND 218 to a logic "1". Now, the two inputs to NAND 230 from NAND 218 and flip-flop 223 are at logic "1". NAND 230 is therefore set to logic "0" for the 250-nanosecond period of the IR signal, S3. This output of NAND 230 is the strobe signal, S4, which is applied to the sector address register 26 and as a reply to the computer. Upon termination of the IR signal, NAND 217 returns to logic "1", NAND 218 to logic "0", and NAND 230 to logic "1".

The logic "0" output of NAND 230, S4, is connected to the reset terminal, R, of flip-flop 219 to reset it to a logic "0" state.

Flip-flop 223 is reset to logic "0" by approximately a 40-nanosecond pulse, S5, occurring at the termination of the strobe signal, S4. During the 250-nanosecond period of strobe signal, NAND 224 is set to a logic "1" by the logic "0" of NAND 230. The logic "0" of NAND 230 sets NANDs 225–229 so as to provide a logic "1" at the second input of NAND 224. Upon termination of the strobe signal, NAND 230 applies a logic "1" signal to NANDs 224–226. NANDs 225–229 now provide a logic "0" at the second input of NAND 224 after a delay of approximately 40 nanoseconds. This delay is the inherent time delay through the NANDs 225–229. During this 40-nanosecond period both inputs to NAND 224 are at logic "1" which sets NAND 224 to logic "0". This logic "0" state of NAND 224 resets flip-flop 223 to a logic "0" state.

Step (f)

The computer then applies the data disc write/select code to data disc write/select converter 109 (FIG. 3)

by way of lines 104. Upon detecting the code, the data disc write/select converter 109 sets the DDW/SF flip-flop 114 to a logic "1". The DDW/SF flip-flop output is a DDW/SF signal which is "anded" with the FR signal to set NAND 221 (FIG. 4) to a logic "0" state. NAND 221 in turn sets NANDs 202, 203, 204, 205, and 206 to provide a reply signal by way of line 207 to the computer to indicate that the data disc flip-flop has now been set.

Step (g)

The computer now sends out a data code with an IR signal; however, the control unit 25 does not send back a reply signal until the seismic trace has been recorded on the data disc. The sector counter 27 indicates at all times which sector on the data disc is passing under the recording heads. This counter is a 10bit synchronous counter and, in one specific embodiment, includes two conventional SN74193N counter elements connected in series and supplied by Texas Instrument Incorporated, Dallas, Tex. Clock pulses for the sector counter 27 are the sector clock pulses from the data disc. The sector counter is reset to "0" once for every revolution of the disc by track origin signals. The sector counter output is applied to a comparator 28. Logic elements GD807, again supplied by Monitor Systems, Inc., are suitable for utilization as the 10 stages of comparator 28. Also applied to comparator 28 is the output of sector address register 26. Logic cards RT801 supplied by Monitor Systems, Inc., Fort Washington, Pa., may be utilized for sector address register 26. The contents of sector counter 27 and sector address register 26 are compared at all times by the comparator 28. When the sector counter advances to the same value as the second address, the comparator will provide a coincidence signal of a logic "1" and will stay at logic "1" for the duration of that sector on the data disc.

Figure 6:
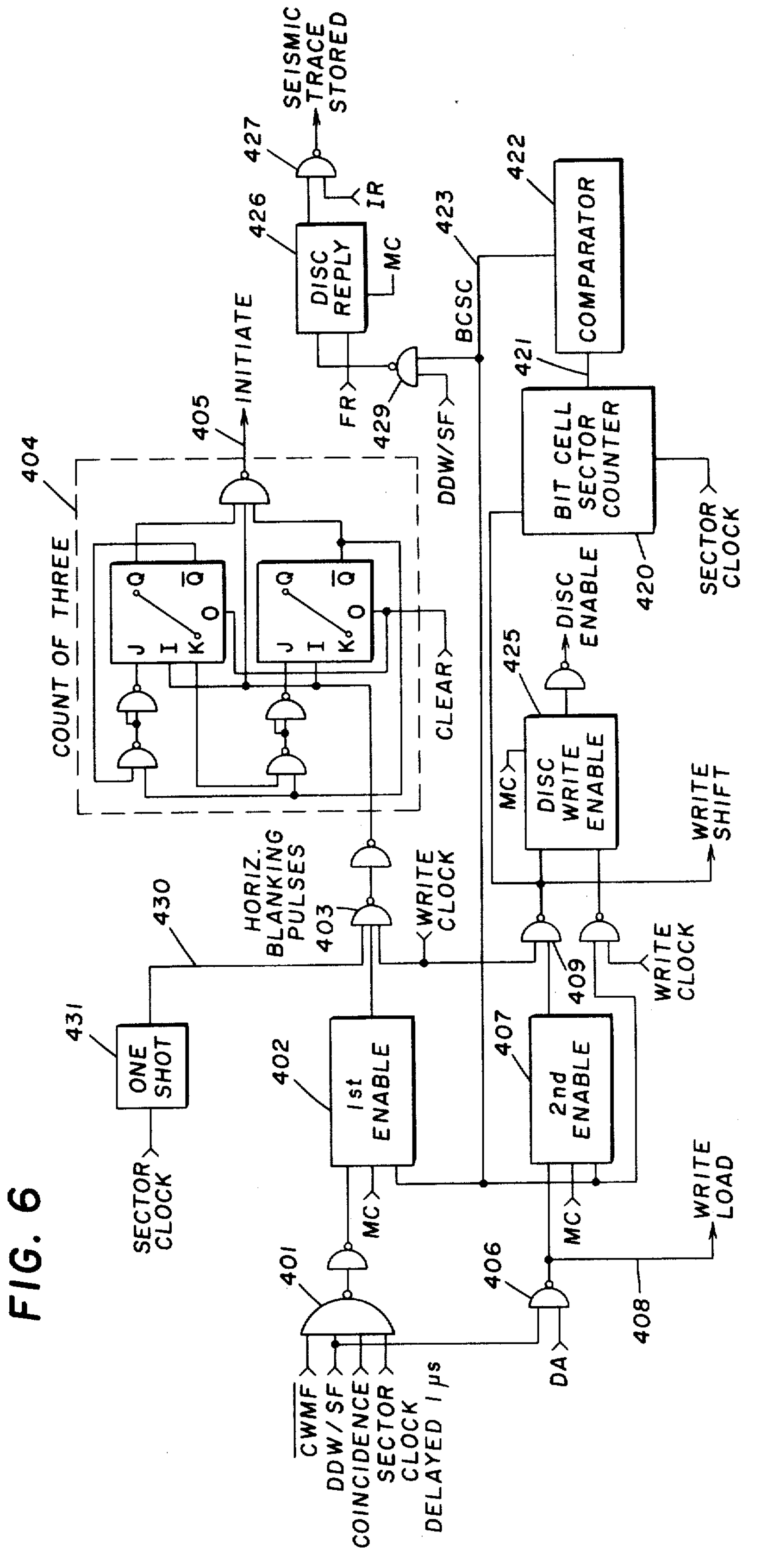

The coincidence signal is "anded" with the logic "1" levels of the DDW/SF signal and the $\overline{\text{CWMF}}$ signal by NAND 401 (FIG. 6). The same sector clock pulses that advance the sector counter 27 have been delayed 1 microsecond and then applied to NAND 401 for stabilization purposes. When there is coincidence between the sector counter 27 and the sector address register 26, NAND 401 sets the first enable flip-flop 402 to a logic "1". The logic "1" output of the first enable flip-flop is "anded"by way of NAND 403 with the horizontal blanking pulse on line 430. The horizontal blanking pulse is a logic "0" signal, 5 microseconds wide, provided for by 1-shot multivibrator 431 at the start of each sector clock pulse. The horizontal blanking pulse is provided to prevent recording on the data disc during the advance from one data disc sector to the next. Write clock pulses from the data disc are also "anded" with these two signals by NAND 403. These write clock pulses are the clock pulses for the count-of-three circuit 404. The first write clock pulse after the 5-microsecond period of the horizontal blanking pulse, and every third write clock pulse thereafter, causes the count-of-three circuit 404 to count up to three and thereby provide an initiate signal on line 405. The first initiate signal is applied to NAND 317 (FIG. 5) for providing a cycle initiate signal by way of gate 318, one-shot multivibrator 319, and gate 320 to the core memory for transferring a 45-bit word out of the proper location in the core memory. The next initiate signal transfers the next 45-bit word out of the core memory. Four hundred fifty nanoseconds after each cycle initate signal, the core memory sends a DA signal to NAND 406. The DA signal is "anded" with DDW/SF signal by NAND 406 to set the second enable flip-flop 407 to a logic "1". Each DA signal creates a write load signal on line 408 which is applied to each of the 15 4-bit shift registers 29 to load the 45-bit data word from core memory into the 15 4 -bit shift registers. A shift register, in one specific embodiment of the invention, utilizes logic elements of the SN7400 conventional series supplied by Texas Instruments Incorporated. Each stage of the 15 register stages is as illustrated in FIG. 8. The "NAND" gates are SN7400N elements and the flip-flops are SN7474N elements. When the second enable flip-flop 407 is set to a logic "1", NAND 409 provides a write shift signal for the shift registers 29 by "anding" the write clock pulse with the logic "1" output of the second enable flip-flop 407. The write load signal places 45 data bits into the 15 shift registers 29. Each shift register stores three bits. After each write load signal, three write shift signals are produced. The write shift signals shift each of three bits out at the write rate. Each write clock pulse therefore shifts a 15-bit word to fifteen separate recording heads on the data disc. First, a 45-bit data word is loaded into the shift register 29 and then shifted three 15-bit words at a time at a 3-megacycle rate out of the shift register in parallel to be recorded on the data disc before the next 45-bit word is loaded into the shift register.

At the same time, these write clock pulses are applied to bit cell/sector counter 420. Counter 420 is of the same configuration and may include the same SN74193N elements in series as that described for the sector counter 27. The output of this counter is connected by line 421 to comparator 422. Comparator 422 compares the count of the bit cell/sector counter 420 with a number preset in the comparator. When the bit cell/sector counter counts up to 168, a BCSC signal is provided on line 423. Comparator 422 is of the same configuration and may include the same GD807 logic element as that described for comparator 28. This BCSC signal resets the first enable flip-flop 402, second enable flip-flop 407, the disc write/enable flip-flop 425, and the DDW/SF flip-flop 114. As soon as the disc write/enable flip-flop 425 goes to logic "0", the recording on the data disc on the chosen sector is terminated. The BCSC signal is also "anded" by NAND 429 with the DDW/SF signal. When the DDW/SF flip-flop 114 has been set to a logic "1", the disc reply flip-flop 426 is then set to a logic "1". NAND 427 "ands" the disc reply flip-flop output with the IR signal to provide a seismic trace stored signal. The seismic trace stored signal is a logic "1" signal which is applied to NAND 204 for setting NANDs 204, 205, and 206 to generate a reply signal to the computer, indicating that the seismic trace has been recorded on the data disc in the selected sector.

Step (h)

When the computer receives the reply signal from the data disc reply flip-flop 426, it goes to the next step in the operation which is the generation of a TC signal. The computer at this point generates an FR signal which resets the disc reply flip-flop 426. No more data can be recorded on the data disc since the BCSC signal from comparator 422 has reset the first enable and second enable flip-flops 402 and 407, respectively. The computer can now load the next seismic trace into the core memory.

Displaying the Disc Data on the TV Monitor

The data disc 12 is a parallel digital data disc consisting of 45 data channels. The disc records informations at a 3-megacycle rate, while the core memory 20 is unloaded at a 1-megacycle rate. The 45-bit data words from the core memory 20 have been fed in parallel into the 15 4-bit shift registers 29 and then shifted out into the data disc 12 fifteen bits at a time at a 3-megacycle rate onto 15 parallel tracks on the data disc. A read clock pulse is provided to transfer the 15-bit parallel outputs of the data disc by way of five 4-bit shift registers 30. Each of the five shift register stages is of the same configuration and includes the same SN7400N gates and SN7474N flip-flops as those illustrated in FIG. 8. Shift registers 30 provide 5-bit data word outputs at a 9-megacycle rate to the D/A converter 13. Each read clock pulse produces one read load signal and three read shift signals. The read load signal is a 50-nanosecond-wide pulse generated by passing the read clock pulse through gates 501–508 and a 5-nanosecond delay line 509. The read load signal is then passed through a series of delay lines 510–512 to produce three read shift signals. Gates 513–516 along with delay line 510 provide a first read shift signal on line 517 to gate 518 approximately 60 nanoseconds after the start of the read load signal. Gates 519 and 520 along with delay line 511 provide a second read shift signal on line 521 to gate 518 approximately 110 nanoseconds after the first read shift signal. Gates 522 and 523 along with delay line 512 provide a third read shift signal on line 524 to gate 518 approximately 110 nanoseconds after the second read shift signal. The read load signal is coupled to each of the five shift registers 30 for storing 15 bits at a time in parallel. Each read shift signal is coupled to each of the shift registers 30 to shift a 5-bit data word out of the registers. The D/A converter 13 transforms the binary output of shift registers 30 to an analog video signal which is used to intensity modulate the electron beam in TV monitor 14.

A suitable D/A converter is an Epsco Mode 0029 with a conversion rate of up to 10 megacycles supplied by Epsco Incorporated of Westwood, Massachusetts. A suitable TV monitor is a Conrac TV Monitor Model CQF modified for 525-line operation supplied by Conrac Corporation of Covina, Cal. The monitor can display a cross section of 480 traces.

Timing and Controls

The four control signals from the digital disc, namely, the write clock, read clock, sector clock, and track origin, are listed below in TABLE II along with the frequencies at which each occurs. The read load, read shift, write load, and write shift signals from control unit 25 are also listed along with the frequencies at which each occurs.

TABLE II

| | |
|---|---|
| Write clock | 2.9925 MC |
| Read clock | 2,9925 MC |
| Write load | 0.9975 MC |
| Read load | 2.9925 MC |
| Write shift | 2.9925 MC |
| Read shift | 8.9775 MC |
| Sector clock | 15750 pps |
| Track origin clock | 30 pps |

Figure 10:
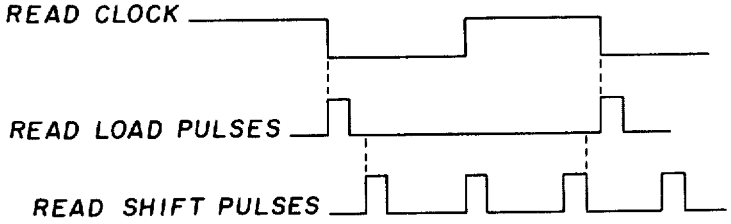
FIGS. 9 and 10 are timing diagrams of the waveforms of various signals listed in TABLE II.
Figure 9:
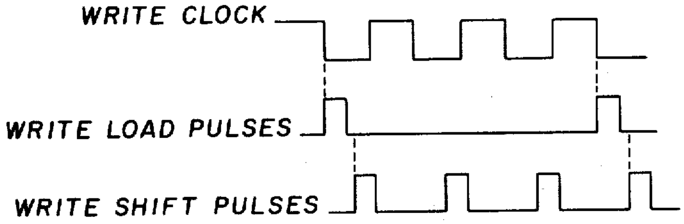

As previously discussed, during the operation of transferring a 45-bit word from the core memory onto the digital disc, one write load signal and three write shift signals are generated for every three write clock cycles. This relationship is illustrated in FIG. 9. During the operation of transferring data from the digitial disc to the D/A converter, one read load signal and three read shift signals are generated for every read clock cycle. This relationship is illustrated in FIG. 10.

Figure 11:
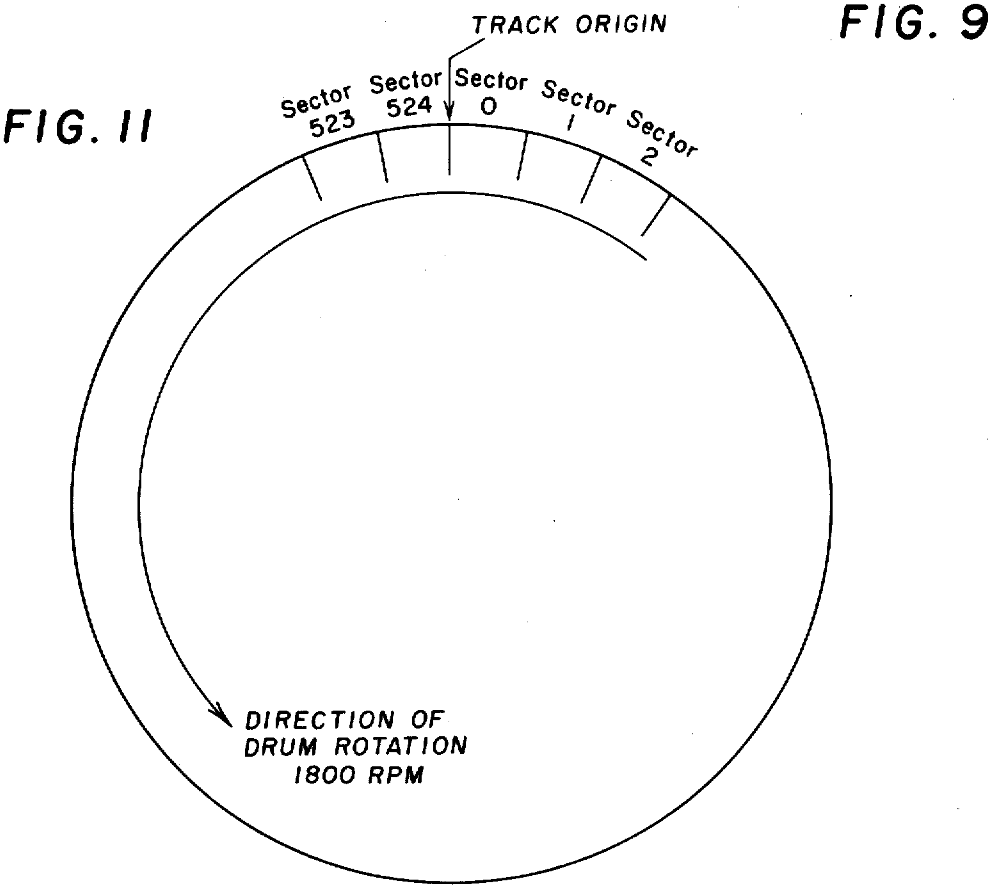
FIG. 11 is a sector layout of the digital disc of FIG. 2.

FIG. 11 is a diagram of the sector layout on the digital disc which has:

525 sectors around circumference of disc, 190 bit cells per sector, 1 bit cell for every clock pulse, and 525 × 190 = 9,9750 clock pulses around circumference of disc except for 7 missing clock pulses to create a track origin pulse.

The foregoing detailed description of the invention has described in detail the operation of the video display system in loading the core memory with a seismic trace from the computer and also in loading the digital disc with the seismic traces from the core memory. The various units illustrated in FIG. 2, with the exception of the control unit 25, have been described in detail along with a description of component parts and manufacturers' names and addresses.

In accordance with the circuitry described above and illustrated in FIGS. 3–7 for the components of control unit 25, the following TABLE III sets forth those components and manufacturers utilized in one specific embodiment of the invention:

TABLE III

| Component | Description |
|---|---|
| Gates | SN7400N Series (Texas Instruments) |
| Flip-flops | SN7472N Series |
| Multivibrators **319** and **431** | SN74121N, Series |
| Counters in circuits **302** and **404** | SN7473N, Series |
| Counters in circuit **420** | SN74193N, Series |
| Comparator **422** | GD807 (Monitor Systems) |
| Delay circuits **510** | 5 nanoseconds (BelFuse, Jersey City,N.J.) |
| Delay circuits **509** | 30 nanoseconds |
| Delay circuits **511** and **512** | 90 nanoseconds |
| Delay circuits **303** | 200 nanoseconds |
| Delay circuits **214** | 500 nanoseconds |

Various modifications to the disclosed embodiment, as well as alternate embodiments, may become apparent to one skilled in the art without departing from the scope and spirit of the invention as defined by the appended claims.

I claim:

1. A system for processing digital data comprising:

a. a cyclical storage device including a plurality of data storage sectors located around the periphery of a rotatable disc and magnetic write heads fixed adjacent said disc and past which each of said sectors is cyclically advanced, b. a clock signal generated at the beginning of each revolution of said cyclical storage device and prior to the first data storage sector being rotated past said write heads, c. a computer, d. an address code generated by said computer, said address code representing the particular subsequent storage sector on which digital data is to be stored, e. a register for storing said address code, f. a plurality of successive command signals generated by said computer following the generation of said address code, g. means responsive to the first of said plurality of command signals to occur subseauent to the termination of said clock signal for strobing said address code into said register, h. means for comparing the content of said register with the rotational position of said disc, and i. means for transferring digital data to said cyclical storage device when the data storage sector represented by said address code in said register is rotated into a position adjacent said magnetic write heads.

2. The system as set forth in claim 1 wherein said means for strobing said address code into said register includes:

a gate with one input set by the occurrence of the first clock signal following the termination of one of said plurality of command signals and a second input set by the generation of the next succeeding command signal following the termination of said clock signal, said gate thereby providing a strobe signal to said register for the duration of said next succeeding command signal for strobing said address code into said register.

3. The system as set forth in claim 2 further including:

means responsive to said strobe signal for providing a reply signal to said computer indicating that said address code has been stored in said register, said reply signal having a pulse width equal to the pulse width of each of said plurality of command signals.

4. The system as set forth in claim 1 wherein said means for strobing said code into said register comprises:

a first flip-flop which is set by one of said command signals, b. a first gate with one input coupled to the output of said first flip-flop and a second input coupled to the output of said cyclical storage device which provides said clock signal, said first gate being set upon the generation of a clock signal after the setting of said first flip-flop, c. a second flip-flop which is set by the setting of said first gate, d. a second gate with one input coupled to the output of said second flip-flop and a second input to which is coupled said plurality of command signals, said second gate being set for the duration of the first one of said command signals to occur after the setting of said second flip-flop, whereby said address code is strobed into said register upon the setting of said second gate, and e. means responsive to the setting of said second gate for producing a reply signal having a pulse width equal to the pulse width of each of said plurality of command signals, said reply signal being applied to said computer to indicate that the sector address has been strobed into said register.

* * * * *

UNITED STATES PATENT OFFICE
CERTIFICATE OF CORRECTION

Patent No. 3,792,442 Dated Feb. 12, 1974

Inventor(s) Gerard D. Koeijmans

It is certified that error appears in the above-identified patent and that said Letters Patent are hereby corrected as shown below:

Column 1, line 23, "which" should be --such--;
line 25, "digtal" should be --digital--.
Column 2, line 28, After "FIG. 4" the semicolon (;) should be a period (.);
line 36, "a" should be inserted before "computer".
Column 5, line 38, "an" should be --and--.
Column 6, line 6, "fliplflop 120" should be --flip-flop 120--.
Column 7, line 28, "dicated" should be --itiated--.
Column 8, line 14, "oprator sends" should be --computer sends--.
Column 9, line 31, "O" should be --"0"--;
line 43, "TR pulse" should be --IR pulse--.
Column 10, line 9, "an" should be --and--;
line 11, "NAND 220" should be --NAND 230--.
Column 11, line 16, "10bit" should be --10-bit--.
Column 12, line 40, "element" should be --elements--.
Column 13, line 40, "Mode" should be --Model--.
Column 14, lines 33-36, Ditto marks (") should be placed after "SN7472N Series", "SN74121N Series", "SN7473N Series", and "SN74193N Series" to show that these are manufactured by Texas Instruments.
lines 38-41, Ditto marks (") should be placed after "30 nanoseconds", "90 nanoseconds", "200 nanoseconds", and "500 nanoseconds" to show that these circuits are manufactured by BelFuse, Jersey City, N.J.
lines 62-63, "subsequent" should be --data--.
Column 15, line 2, "subseauent" should be --subsequent--.
Column 16, line 4, "a." should be inserted before --a--.

Signed and sealed this 16th day of July 1974.

(SEAL)
Attest:

McCOY M. GIBSON, JR.
Attesting Officer

C. MARSHALL DANN
Commissioner of Patents